INVENTOR
ROBERT J. LITWILLER

BY Roy C. Hopgood
ATTORNEY

April 16, 1963 R. J. LITWILLER 3,086,128

SERIAL INPUT BINARY TRIGGER CIRCUIT HAVING THIRD LEVEL INPUT SIGNALS

Filed Nov. 17, 1960 2 Sheets-Sheet 2

INVENTOR.
ROBERT J. LITWILLER

BY Roy C. Hopgood

ATTORNEY

United States Patent Office 3,086,128
Patented Apr. 16, 1963

3,086,128

SERIAL INPUT BINARY TRIGGER CIRCUIT HAVING THIRD LEVEL INPUT SIGNALS

Robert J. Litwiller, Poughkeepsie, N.Y., assignor to International Business Machines Corporation, New York, N.Y., a corporation of New York Filed Nov. 17, 1960, Ser. No. 69,960
13 Claims. (Cl. 307—88.5)

This invention relates to bistable circuits, and more particularly to binary triggers.

An object of the invention is to provide an improved binary trigger.

A further object of the invention is to provide an improved transistor circuit which requires fewer transistors than heretofore employed for purposes of constituting a binary trigger.

Still another object of the invention is to provide an improved binary trigger which avoids the so-called "race" problem.

A feature of the invention is that its operation can be effected through the use of a single input as contrasted to the use of two or more inputs employed in known circuits.

Still another feature of the invention is its flexibility insofar as the transistor circuits are concerned in that P-type and N-type inputs can be accommodated by appropriate design.

Briefly, to achieve the above and other of its objects, the invention contemplates the operative association of latch and trigger circuits wherein third level and split level signals are employed so that with a single input signal a binary trigger response is obtained whereby two binary states or conditions are alternately exhibited.

The invention will be better understood from the following detailed description of a preferred embodiment thereof, as illustrated in the accompanying drawing in which.

According to the invention, a circuit is provided which alternately exhibits binary states (on or off; zero or one) in response to a sequence of input pulses. The input pulses employed in accordance with the invention are so-called third level signals, as will be indicated in greater detail hereinafter.

Figure 1:
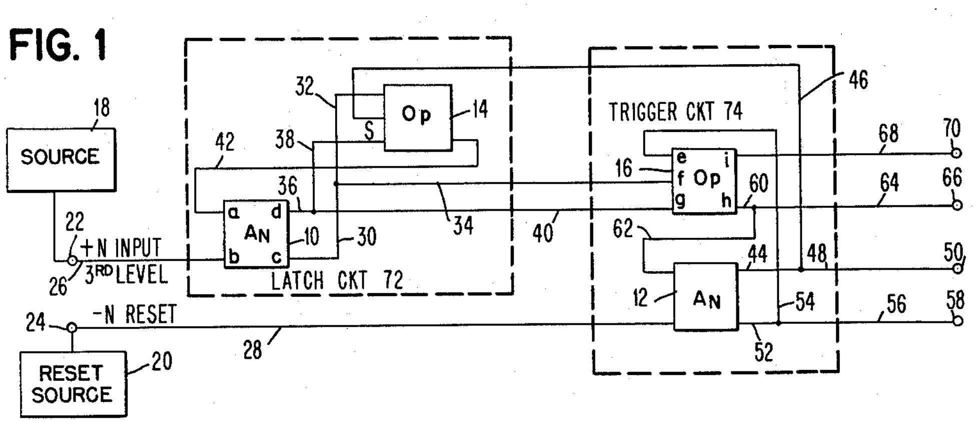
FIG. 1 is a block diagram of a binary trigger provided in accordance with a preferred embodiment of the invention.

The circuit of FIG. 1 comprises generally an input circuit or gate 10, output circuits 12 and 16 and two split level or-circuits 14 and 16.

Operatively associated with the above-noted circuits is an input signal source 18 and a reset signal source 20. Source 18 applies its input signals to a terminal 22, whereas reset signal source 20 applies its reset signals to a terminal 24. Lines 26 and 28 respectively connect terminals 22 and 24 to input circuit 10 and output circuit 12.

Input circuit 10 generates an in-phase output signal which is transmitted via line 30 and via branch lines 32 and 34 to or-circuits 14 and 16 respectively. Input circuit 10, furthermore, generates an out-of-phase output signal which is transmitted via line 36 and branch lines 38 and 40 to or-circuits 14 and 16 respectively.

Or-circuit 14 generates an in-phase output signal which is transmitted in feedback relationship to input circuit 10 via line 42.

Output circuit 12 generates an out-of-phase output signal which is transmitted via line 44 and branch lines 46 and 48 to or-circuit 14 and output terminal 50 respectively. Furthermore, output circuit 12 generates an in-phase output signal which is transmitted via line 52 and branch lines 54 and 56 to or-circuit 16 and output terminal 58 respectively.

Or-circuit 16 generates an in-phase output signal which is transmitted via line 60 and branch lines 62 and 64 to output circuit 12 and output terminal 66 respectively. Moreover, or-circuit 16 generates an out-of-phase output signal which is transmitted via line 68 to output terminal 70.

Lines 46 and 54 are feedback lines which respectively couple the out-of-phase output signals of output circuit 12 to or-circuit 14 and the in-phase output signal to or-circuit 16.

Input circuit 10 has two input signals or inputs which are designated in the drawing as *a* and *b* and which assume either of two voltage levels. Circuit 10, moreover, has in-phase and out-of-phase output signals or outputs designated in the drawing as *c* and *d*. The following table illustrates the general response of circuit 10 to input signals, the reference to positive and negative in this table indicating relative magnitudes rather than absolute polarities.

TABLE I

| Input | | Output | |
|---|---|---|---|
| *a* | *b* | *c* | *d* |
| Pos. | Pos. | Pos. | Neg. |
| Neg. | Pos. | Neg. | Pos. |
| Pos. | Neg. | Neg. | Neg. |
| Neg. | Neg. | Neg. | Neg. |

Split level or-circuits 14 and 16 are similar to each other, the difference therebetween being that or-circuit 14 has no out-of-phase output. Accordingly, the operation of circuit 16 will next be indicated as typical of both circuits, since this operation includes all the responses of circuit 14.

Thus, for example circuit 16 is provided with three input signals which are indicated in the drawing as *e*, *f* and *g*. Input *g* is a split level signal as will be indicated in greater detail hereinafter. Circuit 16, moreover, has an in-phase output indicated as *h* and an out-of-phase output indicated as *i*. The following table indicates the response of the circuit 16 to various combinations of input signals.

TABLE II

| Input | | | Output | |
|---|---|---|---|---|
| *e* | *f* | *g* | *h* | *i* |
| Pos.-- | Pos.---- | Neg.---- | Pos.---- | Neg. |
| Neg.-- | Pos.---- | Neg.---- | Pos.---- | Neg. |
| Pos.-- | Neg.---- | Neg.---- | Pos.---- | Neg. |
| Neg.-- | Neg.---- | Neg.---- | Neg.---- | Pos. |
| Neg.-- | Neg.---- | Pos.---- | Neg.---- | Pos. |
| Pos.-- | Pos.---- | Pos.---- | Neg.---- | Pos. |
| Neg.-- | Pos.---- | Pos.---- | Neg.---- | Pos. |
| Pos.-- | Neg.---- | Pos.---- | Neg.---- | Pos. |

Output circuit 12 is an and-gate. When both of the input signals applied thereto are positive, circuit 12 transmits, via line 52, an in-phase output signal which is positive and, via line 44, an out-of-phase output signal which is negative. When either or both of the input signals applied to circuit 12 is negative, circuit 12 transmits a negative signal via line 52 and a positive signal via line 44.

Circuits 10 and 12 are N-type transistor circuits which each employ a plurality of N-base transistors. With respect to each of these circuits, the transistors therein to whose base is applied the most negative signal controls the output as will be shown hereinafter.

Circuits 14 and 16 are P-type transistor circuits which consist of P-base transistors. In these circuits, the transistor to whose base the most positive signal is applied controls the output as will be shown hereinafter.

Lines which supply input signals to N-type circuits 10 and 12 will be known as N-lines. There are two types of N-lines which may be hereinafter respectively referred to as standard or third level N-lines. There is only one third level N-line which is, specifically, line 26 and supplies to circuit 10 the input signal consisting of pulses which are to be "counted."

For purposes of explanation, voltage values for the signals on the N-lines will next be indicated, the values assigned being non-limitative and being given for purposes of example only. Thus, for purposes of explanation, signals on the standard N-lines will hereinafter be assumed to be referenced at ground and to have a positive and negative swing of ½ of a volt so that a positive signal on a standard N-line is +0.5 volt, whereas a negative signal on a standard N-line is −0.5 volt. Signals on the third level N-line have a positive swing of ½ of a volt and a negative swing of −1½ volts, so that a positive signal on line 26 is +0.5 volt and a negative signal on line 26 is −1.5 volts.

Lines which apply input signals to P-type circuits 14 and 16 will be known as P-lines. There are two types of P-lines, namely standard P-lines and split level P-lines. Signals on the standard P-lines are referenced at −6 volts and are given positive and negative swings of ½ a volt so that a positive signal on a standard P-line is −5.5 volts and a negative signal is −6.5 volts.

There are two split level P-lines, namely lines 38 and 40, in the illustrated circuit. Signals on these lines swing between −4.5 and −6 volts.

It is to be noted that while the above values can be varied, line 26 is adapted to apply the most negative voltage to circuit 10 and therefore dominates this circuit and lines 38 and 40 provide signals which swing more positively than the other input signals applied to circuits 14 and 16 and thus dominate these circuits.

Generally, it will be noted that circuits 10 and 14 constitute a latch circuit 72, the function of which is to retain or preserve input signals applied thereto. At the same time, it may be noted that circuits 12 and 16 respectively form a trigger circuit 74, the function of which is to exhibit either of two stable states which are indicative of binary conditions.

Figure 2:
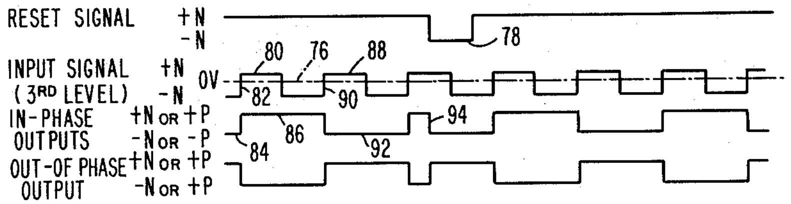
FIG. 2 is a signal diagram showing signal forms for the circuit of FIG. 1.

The overall function of the circuit of FIG. 1 is best noted with reference to FIG. 2, wherein are indicated the reset and input signals, as well as the in-phase and out-of-phase outputs of circuits 12 and 16, the in-phase outputs appearing at terminals 58 and 66 and the out-of-phase outputs appearing at terminals 50 and 70.

As seen in FIG. 2, the input signal consists of a sequence of square-wave pulses which swing about reference level 76 (ground or zero volts), as indicated above. This input signal is applied by source 18 to terminal 22 and thence via line 26 to circuit 10.

The reset signal is normally maintained positive and is arbitrarily made negative such as indicated by negative pulse 78.

The input pulses cause the output signals to change between two stable states which are maintained until the arrival of the next sequential input pulse. For example, at the beginning of input pulse 80, the leading edge of which is indicated at 82, the in-phase output changes from the level indicated at 84 to that indicated at 86. In other words, the in-phase output signal swings from a relatively negative level to a relatively positive level. At the beginning of the second pulse 88, whose leading edge is indicated at 90, the in-phase output swings from level 86 negatively to level 92 or, in other words, the output becomes negative.

Although the input pulses cause changes in the output of the trigger circuit, the application of reset pulses 78 overrides or dominates the input pulses and causes the in-phase output signal to become negative despite what may otherwise be indicated by the input pulses. This is shown by the negative swing which is illustrated at 94 and which is the result of the application of pulse 78.

Additionally, it will be noted in FIG. 2 that the out-of-phase output signal is opposite to the in-phase output signal.

Figure 3:
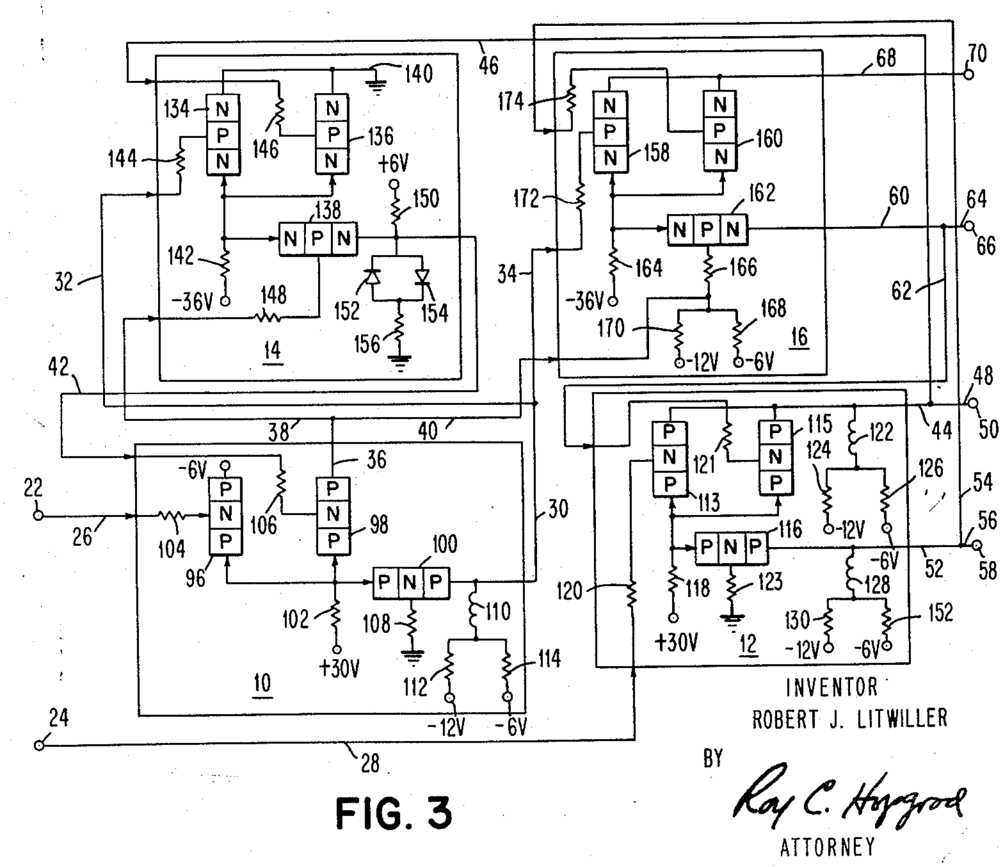
FIG. 3 is a schematic development of the block diagram of FIG. 1.

FIG. 3 schematically indicates the details of the circuit diagrammatically illustrated in FIG. 1 and illustrates more particularly the transistor arrangement of circuits 10 to 16.

Circuit 10 comprises transistors 96, 98 and 100. These transistors are of the P-N-P or N-base type. The emitters of transistors 96, 98 and 100 are connected in common and via resistor 102 to a source of positive voltage such as, for example, +30 volts. The base of transistor 96 is connected via resistor 104 and line 26 to input terminal 22, whereas the collector of this transistor is connected to a source of negative voltage such as, for example, −6 volts. The base of transistor 98 is connected via resistor 106 to line 42, the collector of transistor 98 being connected to line 36 and thence to lines 38 and 40. Transistor 100 is the reference transistor of circuit 10 and has its base coupled via resistor 108 to ground. The collector of transistor 100 is connected on the one hand to line 30 and, on the other, by a choke 110 to a voltage divider consisting of resistors 112 and 114 respectively connected to negative voltages such as, for example, −12 and −6 volts.

By way of example, resistors 104 and 106 may be in the order of 82 ohms, whereas resistor 102 is 4500 ohms. Choke 110 is, for example, 1.5 millihenries, whereas resistors 112 and 114 can be 2150 and 187 ohms respectively.

It will be noted, with respect to circuit 10, that the collectors of the various transistors have no common connection and are all independent. Only one of the transistors in circuit 10 conducts at a given time and this will be the transistor to which the most negative signal is applied.

Circuit 12 consists of transistors 113, 115 and 116. These transistors are all N-base transistors whose emitters are connected in common and thence via resistor 118 (4500 ohms) to a source of positive voltage such as, for example, +30 volts.

The base of transistor 113 is connected via resistor 120 (82 ohms) and line 28 to reset terminal 24. The collectors of transistors 113 and 115 are connected in common to line 44 and thence to lines 46 and 48. The base of transistor 115 is connected via resistor 121 (82 ohms) to line 62. The base of transistor 116 is connected via resistor 123 to ground.

It will also be noted that the common collectors of transistors 113 and 115 are connected via a choke 122 (1.5 millihenries) and a voltage divider consisting of resistor 124 (2150 ohms) and a resistor 126 (187 ohms) to negative voltage supplies of −12 and −6 volts respectively. The collector of transistor 116 is connected to line 52 and by choke 128 (1.5 millihenries) to a voltage divider consisting of a resistor 130 (2150 ohms) and a resistor 132 (187 ohms) to negative voltage supplies of —12 and —6 volts respectively.

Circuit 14 comprises transistors 134, 136 and 138. These transistors are of the N-P-N or P-base type and the collectors of two of these transistors are connected in common so that either or both may conduct whereby the current can be split therebetween.

More particularly, the collectors of transistors 134 and 136 are connected via line 140 to ground, the emitters of these transistors being connected via a resistor 142 (4500 ohms) to a source of negative voltage such as, for example, —36 volts. It will be noted that the emitter for transistor 138 is also connected to resistor 142 so that the emitters of the three transistors of circuit 14 are connected in common.

The base of transistor 134 is connected via resistor 144 (82 ohms) to line 32 which in turn is connected to line 30 leading from circuit 10. The base of transistor 136 is connected via resistor 146 (82 ohms) to line 46 which in turn is connected to line 44 leading from circuit 12. The base of transistor 138 is connected via resistor 148 (82 ohms) which is connected to line 38.

The collector of transistor 138 is connected via resistor 150 (2150 ohms) to a source of positive voltage such as, for example, +6 volts, this collector being further coupled via oppositely polarized and parallel diodes 152 and 154 and via resistor 156 (75 ohms) to ground. The collector of transistor 138 is further coupled to line 42 which carries signals to circuit 10.

Circuit 16, which functions in a manner similar to that of circuit 14, comprises transistors 158, 160 and 162. The emitters of these transistors are connected in common and via resistor 164 (4500 ohms) to a source of negative voltage such as, for example, —36 volts. The collectors of transistors 158 and 160 are connected in common and via line 68 to output terminal 70. The collector of transistor 162 is connected via line 60 to line 62 and to line 64 connected to terminal 66.

Signals are fed to the base of transistor 162 via line 40 and a resistor 166 (82 ohms), the line 40 also being coupled via resistors 168 (249 ohms) and 170 (45,300 ohms) to negative voltage sources respectively supplying —6 and —12 volts.

The base of transistor 158 is connected via resistor 172 (82 ohms) to line 34. The base of transistor 160 is connected via resistor 174 (82 ohms) to line 54.

To facilitate an explanation of the operation of the circuit illustrated in FIG. 3, the output voltages or signals which are generated in response to various combinations of input voltages or signals will next be tabulated below. In the tables, the voltages appearing on the input lines for all possible combinations will be indicated and the voltages resulting on the output lines will be listed in correspondence to the input conditions.

TABLE III

*Circuit 10*

| Condition | Input Lines | | Output Lines | |
|---|---|---|---|---|
| | 26 | 42 | 30 | 36 |
| | Volts | | Volts | |
| (1) | −1.5 | −0.5 | −6.5 | −6.0 |
| (2) | −1.5 | +0.5 | −6.5 | −6.0 |
| (3) | +0.5 | −0.5 | −6.5 | −4.5 |
| (4) | +0.5 | +0.5 | −5.5 | −6.0 |

For the conditions (1) and (2) indicated in Table III, transistor 96 conducts and controls the flow of current in circuit 10. For condition (3), transistor 98 conducts and controls the current flow in circuit 10. For condition (4), transistor 100 conducts and controls the current flow.

TABLE IV

*Circuit 12*

| Input Lines | | Output Lines | |
|---|---|---|---|
| 28 | 62 | 44 | 52 |
| Volts | | Volts | |
| −0.5 | −0.5 | −5.5 | −6.5 |
| −0.5 | +0.5 | −5.5 | −6.5 |
| +0.5 | −0.5 | −5.5 | −6.5 |
| +0.5 | +0.5 | −6.5 | −5.5 |

As noted above with reference to circuit 10, the transistor to whose base the most negative signal is applied controls the current flow in this circuit.

TABLE V

*Circuit 14*

| Input Lines | | | Output Lines |
|---|---|---|---|
| 32 | 38 | 46 | 42 Volts |
| Volts | | | |
| −6.5 | −6.0 | −6.5 | −0.5 |
| −6.5 | −6.0 | −5.5 | +0.5 |
| −6.5 | −4.5 | −6.5 | −0.5 |
| −6.5 | −4.5 | −5.5 | −0.5 |
| −5.5 | −6.0 | −6.5 | +0.5 |
| −5.5 | −6.0 | −5.5 | +0.5 |
| −5.5 | −4.5 | −6.5 | −0.5 |
| −5.5 | −4.5 | −5.5 | −0.5 |

Circuit 16 operates similarly to circuit 14 and the table therefor is as indicated below.

TABLE VI

*Circuit 16*

| Input Lines | | | Output Lines | |
|---|---|---|---|---|
| 54 | 40 | 34 | 60 | 68 |
| Volts | | | Volts | |
| −6.5 | −6.0 | −6.5 | −0.5 | +0.5 |
| −6.5 | −6.0 | −5.5 | +0.5 | −0.5 |
| −6.5 | −4.5 | −6.5 | −0.5 | +0.5 |
| −6.5 | −4.5 | −5.5 | −0.5 | +0.5 |
| −5.5 | −6.0 | −6.5 | +0.5 | −0.5 |
| −5.5 | −6.0 | −5.5 | +0.5 | −0.5 |
| −5.5 | −4.5 | −6.5 | −0.5 | +0.5 |
| −5.5 | −4.5 | −5.5 | −0.5 | +0.5 |

With the above tables indicating the response of the various circuits to the different input conditions which may be established with respect thereto, it is next possible to analyze the operation of the circuits in detail. The specific flow through the various transistors will not be specified inasmuch as this information is summarized and tabulated in the above tables.

Figure 4:
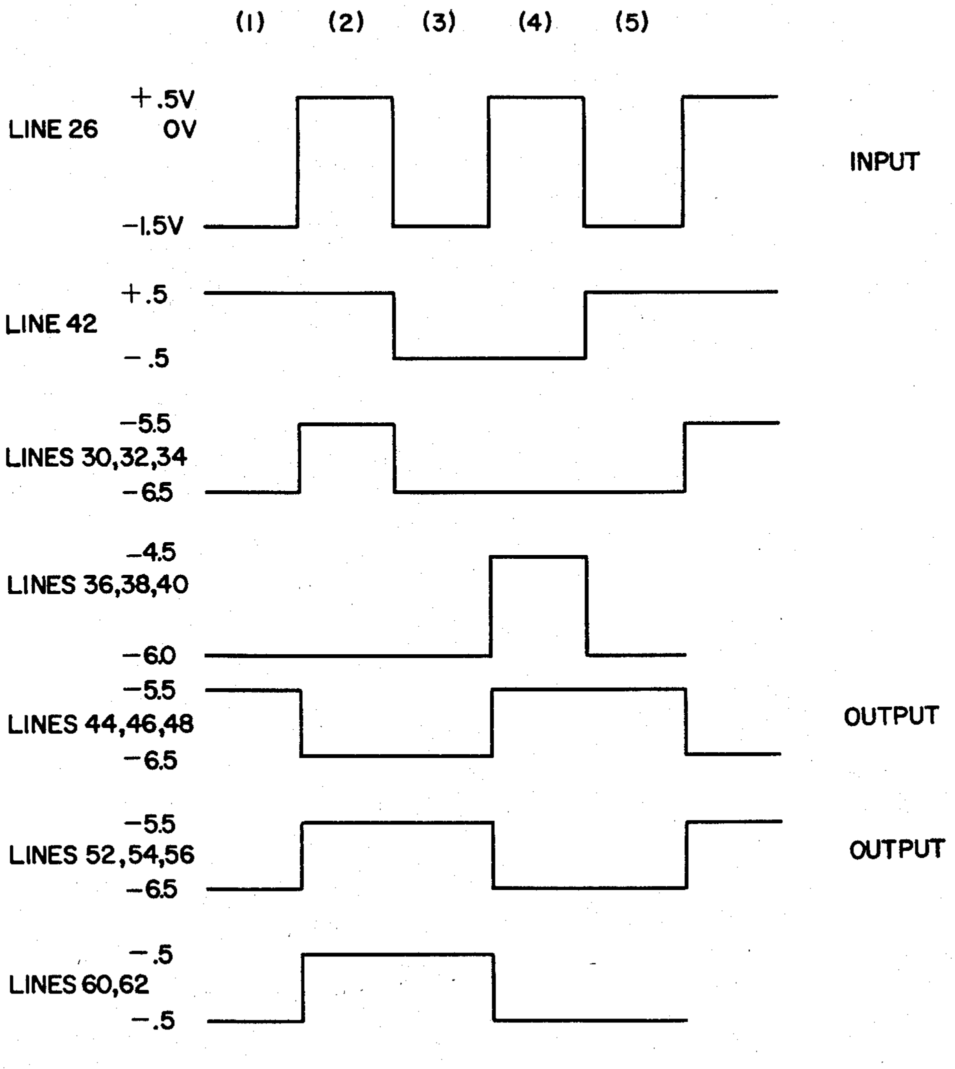
FIG. 4 is a wave-form diagram illustrating the progressive signal levels at various points in the circuit.

Referring now to the wave-form diagram of FIGURE 4, let it be assumed that the signal on line 42 is positive or +0.5 volt and the signal applied to line 26 is —1.5 volts. The signals on lines 30 and 36 will both be negative and respectively at —6.5 and —6 volts. These voltages will also appear on the branch lines coupled to lines 30 and 36. The voltage on lines 38 and 40 will be positive or at —6 volts.

Assuming that the trigger is off, the voltage on line 52 will be negative, or more specifically, at —6.5 volts. The same voltage will appear on line 54.

Accordingly, the most positive signal fed to circuit 16 will appear on line 40 and as a result the most positive signal will be applied to the base of transistor 162. The signal resulting on line 60 will be −0.5 volt (see Table VI).

The signal on line 28 is normally maintained positive and thus the reset signal is at +0.5 volt. Line 52 must then be, as assumed above, negative or at a level of −6.5 volts. At the same time lines 44 and 46 will be at a positive voltage or at a −5.5 volt level.

Line 32 will have a negative signal or will be at a voltage of −6.5 volts. Line 38 is negative and since it carries a split level signal, it will be at a voltage of −6.0 volts. Thus, line 42 is, as assumed above, at a positive signal level of +0.5 volt (see Table V).

Let it next be assumed according to the diagram of FIG. 2 that a positive pulse is applied to line 26 or, in other words, that the voltage thereupon swings positive to a level of +0.5 volt. Line 42 at this time is still, as indicated above, at a level of +0.5 volt.

As a result of the application of a positive pulse on line 26, line 30 becomes positive and assumes a level of −5.5 volts. Line 36 remains negative at a level of −6.0 volts.

Line 30 is connected via branch line 34 to circuit 16 which is receiving a negative signal via line 54 at a level of −6.5 volts. Because of the change of signal on line 34, lines 60, 62 and 64 become positive and move to a level of +0.5 volt, line 62 applying input signals to circuit 12.

As noted above, the signal on line 28 is positive and since the signal on line 62 becomes positive, the signal on lines 52, 54 and 56 becomes positive and assumes a level of −5.5 volts which appears at terminal 58. (This is level 86 in FIG. 2.) At the same time, the signal on lines 44, 46 and 48 becomes negative or, in other words, assumes the level of −6.5 volts which appears at terminal 58. This is indicated by the out-of-phase output corresponding to level 86 in FIG. 2.

Line 54 is coupled in feedback relationship to circuit 16 and carries a positive signal. When the signal on line 26 becomes negative, lines 30 and 34 become negative or assume the level of −6.5 volts. However, since the signal on line 54 is positive (+5.5 volts) as noted above, the condition previously established in circuit 16 is maintained.

Referring to circuit 14, the signal on line 46 is negative (−6.5 volts). The signal on lines 30 and 32 becomes negative (−6.5 volts) when the pulse or signal on line 26 returns to its negative level. The signal on lines 36 and 38 is negative (−6.0 volts). Therefore the signal on line 42 becomes negative (−0.5 volts). This, however, has no effect on circuit 10 because the signal on line 26 is negative (third level), and the signal on line 42 is dominated by that on line 26. Thus, the signal on line 42 has no immediate effect.

The second pulse applied to terminal 22 causes the signal on line 26 to swing positive (+0.5 volt). The signal on line 42, as noted above, is negative (−0.5 volt) and thus the signal on line 30 does not change, but remains negative (−6.5 volts). The signal on line 36 and the branch lines connected thereto swings from negative to positive and thus assumes a level of −4.5 volts.

Referring next to circuit 16, the signal on line 54 has been positive or −5.5 volts. The signal on line 34 has been neagtive or at −6.5 volts. The signal on line 40 has just become positive or has assumed a level of −4.5 volts. As a result, the signal on lines 60, 62 and 64 becomes negative or assumes a level of −0.5 volt, so that circuit 12 now causes a negative signal to appear on lines 52, 54 and 56, this negative signal being at a level of −6.5 volts. At the same time, the signal on lines 44, 46 and 48 becomes positive or assumes a level of −5.5 volts.

As the signal on line 40 now becomes negative (−6.0 volts) as will occur when the signal on line 26 feeding circuit 10 becomes negative, no change in the output conditions of circuit 16 will result since the signal on line 40 remains in control. In other words, this signal dominates circuit 16 since it is a split level signal.

Referring now to circuit 14, the signal on line 32 is now negative or −6.5 volts, the signal on line 46 having gone positive or being at a level of −5.5 volts. Thus, when the signal on line 26 becomes negative, an appropriate signal is fed via lines 30 and 32 to circuit 14 such that the signal on line 42 becomes positive or assumes a level of +0.5 volt. The nature of the split level signal is such that the −6.0 v. level is significant in the function described, that is, when input lines 34 and 54 are at their negative levels, and the −4.5 v. (or positive) level is significant in the function described when either line 34 or 54 goes positive, since the −4.5 v. level at its base is sufficient to render transistor 162 conductive to the exclusion of transistors 158 and 160, even though positive levels are at their bases.

The signal on line 42, however, has to wait for the signal on line 26 to become positive or assume a level of +0.5 volt in order for the circuit 10 to be able to generate an output signal which turns the trigger circuit 74 on again. Thus, it appears that the signal on line 42 alternately conditions the circuit 10 to turn the trigger circuit 74 on and off.

For the above discussion, it has been assumed that the signal on line 28 has been positive or at a level of +0.5 volt. If the trigger circuit 74 is off such that a negative signal appears on line 52 and thus at terminal 58, a negative pulse or signal on line 28 has no effect. If the trigger circuit 74 is on, the signal on lines 52 and 54 is positive or at a level of −5.5 volts. At the same time, the signal on line 46 can be determined to be at a negative level of −6.5 volts and if the circuit is traced through it can be seen that the voltage on line 62 leading from circuit 16 is at a positive level of +0.5 volt. At this time, if the signal on line 28 becomes negative or assumes a level of −0.5 volt, circuit 12 will respond by causing the signals on lines 52, 54 and 56 to become negative or to assume a level of −6.5 volts. Line 54 is connected in feedback relationship to circuit 16 as noted above so that the signal on lines 60 and 62 becomes negative (−0.5 volt) and stays negative until the signal on line 26 next swings to a positive level.

In view of the above, it will be evident that the trigger circuit 74 cannot be turned on or set while the signal on line 28 is negative; and that a negative signal on line 28 will turn off or reset the trigger circuit 74 if the same has been previously turned on.

From what has been stated above, it will be evident that the invention provides a binary trigger which is operable with a single input (as exemplified by terminal 22), the use of a single input avoiding race conditions which may occur when two inputs are employed, as has previously been the case with respect to other drift transistor circuits of the same class.

Domination by the characteristic third level input signal applied to input circuit 10 prevents the new condition set up by circuit 14 from passing through to trigger circuit 74 until the third level signal becomes positive to flip the trigger. Because of the inherent delay in the trigger circuit 74 the feedback signal on line 46 (and 44) must necessarily arrive at the input to circuit 14 after the establishment of the signals on lines 32 and 38. The overriding effect of the third level signal may be further understood by referring to FIGURE 3. When a negative signal is applied to the bases of transistors 96 or 98, transistor 100 will be off and a relatively negative signal will appear on the emitter of transistor 100. The output at the collector of transistor 100 will be relatively negative. If the signals applied to the bases of transistors 96 or 98 are both positive, both transistors 96 and 98 will be off and hence, a relatively positive signal will be applied to the emitter of transistor 100 causing it to turn on and hence, a relatively positive voltage will appear at the emitter terminal.

If the signal to the base of transistor 98 is negative while the signal to the base of transistor 96 is positive, the voltage applied to the emitter of transistor 100 will be relatively negative causing the emitter voltage of transistor 100 to be relatively negative.

It is significant to recognize that if the signal applied to the base of transistor 96 is negative, transistor 98 will be off regardless of whether or not the signal applied to the base of transistor 98 is negative or positive. This occurs because the negative input signal applied over lead 26 is a third level signal and has a greater negative magnitude than the negative signal which is applied to the base of transistor 98. The negative signal appearing on lead 26 causes transistor 96 to conduct more heavily causing the voltage across resistor 102 to decrease sufficiently to prevent any negative signal applied to the base of transistor 98 from turning said transistor on.

The significance of the third level signal is apparent from referring to FIGURE 4. The output from transistor 98 which appears on lead 36 is in controlling relationship in circuit 14. Therefore, the times at which lead 36 is positive are critical. When the third signal which is negative appears on lead 26, the output voltage over lead 42 goes negative. At this time, however, it is not desirable to send a trigger pulse to the trigger circuit which would occur if the voltage at lead 36 went positive. Since the voltage appearing over lead 42 is negative at this time and since transistor 98 ordinarily would conduct when a negative voltage is applied to the base (which would ordinarily cause critical output voltage over lead 36 to become positive) it is necessary at this time to maintain transistor 98 in the off state. As shown in FIGURE 4, the voltage over lead 36 is in fact negative because the negative voltage appearing on line 26 is in overriding controlling relationship to prevent the transistor 98 from turning on. Accordingly, a proper operation of the illustrated circuit is assured.

There will now be obvious to those skilled in the art many modifications and variations of the circuits set forth above. These modifications and variations will not, however, depart from the scope of the invention if defined by the following claims.

What is claimed is:

1. A bistable device comprising input and output circuits responsive to the most negative signals supplied thereto, and first and second feedback circuits responsive to the most positive signals supplied thereto, said output circuit being coupled in feedback relation to said feedback circuits and supplying thereto signals of determinable level, said first feedback circuit being coupled to said input circuit and supplying to the latter signals at a predetermined level, input means coupled to said input circuit and supplying thereto signals which are more negative than said predetermined level and which thus dominate the signals supplied to the input circuit by the first feedback circuit, said input circuit being coupled to said feedback circuits and supplying to the latter signals which are more positive than said determinable level to dominate the signals which are fed to the feedback circuits from said output circuit, and reset means coupled to said output circuit and adapted for applying disabling signals to the same, said output circuit responding to signals from said reset means and second feedback circuit to generate signals indicating one of two stable states.

2. A trigger comprising input and output circuits responsive to signals supplied thereto which have the largest magnitude with respect to a predetermined polarity, and first and second feedback circuits responsive to the signals supplied thereto which have the largest magnitude with respect to the opposite polarity, said output circuit being coupled in feedback relation to said feedback circuits and supplying thereto signals of determinable level, said first feedback circuit being coupled to said input circuit and supplying to the latter signals at a predetermined level, input means coupled to said input circuit and selectively supplying thereto signals which are of greater magnitude than said predetermined level with respect to the first said polarity and which thus dominate the signals supplied to the input circuit by the first feedback circuit, both of said input circuits being coupled to said feedback circuits and selectively supplying to the latter signals which are of greater magnitude than said determinable level with respect to said opposite polarity to dominate the signals which are fed to the feedback circuits from said output circuit, and reset means coupled to said output circuit and adapted for applying a disabling signal to the same.

3. A transistor binary trigger comprising input and output transistor means responsive to the most negative signals applied thereto and first and second feedback transistor means responsive to the most positive signals applied thereto, said output means being coupled in feedback relation to both said feedback means and supplying thereto signals of determinable level, said first feedback means being coupled to said input means and supplying to the latter signals at a predetermined level, and a source of input signals coupled to said input means and supplying thereto signals which are more negative than said predetermined level and which thus dominate the signals supplied to the input means by the first feedback means, said input means being coupled to both said feedback means and supplying to the latter signals which are more positive than said determinable level to dominate the signals which are fed to both said feedback means from said output means.

4. A transistor binary trigger adapted for responding to input and reset signals, said trigger comprising a latch section and a trigger section connected thereto, said latch section receiving said input signals and producing output signals to control said trigger section, said trigger section receiving said reset signals and producing output signals indicating binary states; said latch section including a first transistor circuit receiving said input signals and a second transistor circuit coupled to said first transistor circuit and trigger section and responding to said trigger section to condition said first transistor circuit to respond to the urgent signal by producing output signals; said trigger section including a third transistor circuit coupled to said first transistor circuit for receiving the output signals thereof and producing output signals in turn, and a fourth transistor circuit coupled to and receiving output signals from said third transistor circuit said fourth transistor circuit receiving said reset signal and producing said output signals indicating said binary states, said third transistor circuit being coupled to said fourth transistor circuit in feedback relation, said second means also being coupled to said fourth transistor circuit in feedback relation and being further coupled to said first transistor circuit being controlled in the generation of output signals by said input signals, said second and third transistor circuits being controlled in the generation of output signals by the output signals of said first transistor circuit.

5. A binary trigger adapted for responding to input and reset signals, said trigger comprising latch and trigger sections, said latch section receiving said input signals and producing output signals to control said trigger section, said trigger section receiving said reset signals and responding to said latch section by producing output signals indicating binary states; said latch section including first means receiving said input signals and second means coupled to said first means and trigger sections and responding to said trigger section to condition said first means for producing output signals; said trigger section including third means coupled to said first means for receiving the output signals thereof and producing output signals in turn, and fourth means coupled to and receiving ouput signals from said third means, said fourth means receiving said reset signals and producing the output signals indicating said binary states, said third means being coupled to said fourth means in feedback relation, said second means being coupled to said fourth means in feedback relation and being further coupled to said first means for receiving output signals therefrom, said first means being dominated in the generation of output signals by said input signals, said second and third means being dominated in the generation of output signals by the output signals of said first means.

6. A binary trigger adapted for responding to input and reset signals, said trigger comprising a section for receiving said reset signals and for producing output signals indicating binary states, first means for receiving said input signals, and second means coupled to said first means and said section and responding to said section to condition said first means for producing output signals; said section including third means coupled to said first means for receiving the output signals thereof and producing further output signals in response thereto, and fourth means coupled to and receiving output signals from said third means, said fourth means receiving said reset signals and producing the output signals indicating said binary states, said third means being coupled to said fourth means in feedback relation, said second means also being coupled to said fourth means in feedback relation and being further coupled to said first means for receiving output signals therefrom, said first means being dominated in the generation of output signals by said input signals, said second and third means being dominated in the generation of output signals by the output signals of said first means.

7. A binary trigger responsive to third level input pulses comprising first means adapted for transmitting relatively positive and negative in-phase and out-of-phase output signals to indicate binary conditions, said first means being adapted to transmit a positive in-phase output signal upon the receiving of relatively positive input signals only and being further adapted to receive a normally positive reset signal which becomes negative for the resetting of said trigger, second means adapted for generating relatively positive and negative output signals and being coupled to said first means to transmit the latter said output signal thereto, the in-phase output signal of said first means being transmitted in feedback relation to said second means, third means adapted for generating relatively positive and negative output signals and being coupled in feedback relation to said first means to receive the out-of-phase output signals therefrom, and an input circuit for receiving said third-level input pulses, said input circuit being adapted to generate relatively positive and negative in-phase output signals and relatively positive and negative out-of-phase split level output signals, said input circuit being coupled to said second and third means to transmit the latter said output signals thereto, said input circuit being further coupled in feedback relation to said third means to receive the output signals thereof, said second and third means transmitting relatively positive and negative output signals according to the signals received and being dominated by the received signals having the greatest magnitude with respect to a predetermined polarity, said input circuit transmitting relatively positive and negative signals according to the signals received from said third means and further according to said third level input pulses, said input circuit being dominated by signals of greatest magnitude with respect to a predetermined polarity, said input pulses being the signals fed to said input circuit which are of said greatest magnitude, the split level output signals of said input circuit being the signals of said greatest magnitude received by said second and third means.

8. A transistor binary trigger responsive to third level input pulses comprising a transistor and-gate adapted for transmitting relatively positive and negative first and second output signals to indicate binary conditions, said and-gate being adapted to transmit a positive first output signal upon the receiving of relatively positive input signals only and being further adapted to receive a normally positive reset signal which becomes negative for the resetting of said trigger, a transistor split level or-circuit adapted for generating relatively positive and negative output signals and being coupled to said and-gate to transmit the latter said output signal thereto, the first output signal of said and-gate being transmitted in feedback relation to said or-circuit, a further transistor split level or-circuit adapted for generating relatively positive and negative output signals and being coupled in feedback relation to said and-gate to receive the second output signals therefrom, a source of said third level input pulses, and a transistor input gate coupled to said source for receiving said third level input pulses, said input gate being adapted to generate relatively positive and negative first output signals and relatively positive and negative split level output signals, said input gate being coupled to both said or-circuits to transmit the latter said output signals thereto, said input gate being further coupled in feedback relation to said further or-circuit to receive the output signals thereof, said or-circuits transmitting relatively positive and negative output signals according to the signals received and being dominated by the received signals having the greatest magnitude with respect to a predetermined polarity, said input gate transmitting relatively positive and negative signals according to the signals received from said further or-circuit and further according to said input pulses, said input gate being dominated by signals of greatest magnitude with respect to a predetermined polarity, said input pulses being the signals fed to said input gate which are of said greatest magnitude, the split level output signals of said input gate being the signals of said greatest magnitude received by said or-circuits.

9. A binary trigger responsive to third level input pulses comprising an and-gate adapted for transmitting relatively positive and negative in-phase and out-of-phase output signals to indicate binary conditions, said and-gate being adapted to transmit a positive in-phase output signal upon the receiving of relatively positive input signals only and being further adapted to receive a normally positive reset signal which becomes negative for the resetting of said trigger, a split level or-circuit adapted for generating relatively positive and negative output signals and being coupled to said and-gate to transmit the latter said output signal thereto, the in-phase output signal of said and-gate being transmitted in feedback relation to said or-circuit, a further split level or-circuit adapted for generating relatively positive and negative output signals and being coupled in feedback relation to said and-gate to receive the out-of-phase output signals therefrom, and an input gate for receiving said third-level input pulses, said input gate being adapted to generate relatively positive and negative in-phase output signals and relatively positive and negative out-of-phase split level output signals, said input gate being coupled to both said or-circuits to transmit the latter said output signals thereto, said input gate being further coupled in feedback relation to said further or-circuit to receive the output signals thereof, said or-circuits transmitting relatively positive and negative output signals according to the signals received and being dominated by the received signals having the greatest magnitude with respect to a predetermined polarity, said input gate transmitting relatively positive and negative signals according to the signals received from said further or-circuit and further according to said input pulses, said input gate being dominated by signals of greatest magnitude with respect to a predetermined polarity, said input pulses being the signals fed to said input gate which are of said greatest magnitude, the split level output signals of said input gate being the signals of said greatest magnitude received by said or-circuits.

10. A binary trigger comprising a source of input pulses of determinable level, an input circuit coupled to said source for receiving said pulses, a split level or-circuit coupled to and selectively receiving signals of predetermined magnitude from said input circuit, and a trigger circuit coupled to and receiving signals from said input circuit and responding to the latter said signals by indicating one of two stable states, said trigger circuit being coupled to said split level or-circuit and supplying to the latter a signal indicative of the indicated state and of a magnitude which is less than said predetermined magnitude, said or-circuit being further coupled to said input circuit in feedback relation and responding to the signal of greatest magnitude which it receives by generating a signal which is fed to said input circuit, said or-circuit generating the latter said signal at a level which is less than said determinable level, said input circuit responding to the signal of highest level which it receives by generating output signals for transmission to said trigger circuit for selecting the stable state to be indicated by the latter.

11. A binary trigger responsive to input pulses of determinable level comprising input means for receiving said pulses, circuit means coupled to and selectively receiving signals of predetermined magnitude from said input means, and bistable means coupled to and receiving signals from said input means and responding to the latter said signals by indicating one of two stable states, said bistable means being coupled to said circuit means and supplying to the latter a signal indicative of the indicated state and of a magnitude which is less than said predetermined magnitude, said circuit means being further coupled to said input means in feedback relation and responding to the signal of greatest magnitude which it receives by generating a signal which is fed to said input means, said circuit means generating the latter said signal at a level which is less than said determinable level, said input means responding to the signal of highest level which it receives by generating output signals for transmission to said bistable means for causing a stable state to be indicated by the latter and being conditioned by the signal feedback by said or-circuit to cause said stable states to be indicated alternately.

12. A trigger circuit comprising an input circuit for receiving input pulses of determinable level, a split level or-circuit coupled to and selectively receiving signals of predetermined magnitude from said input circuit, a trigger circuit coupled to and receiving signals from said input circuit and responding to the latter said signals by indicating one of two stable states, said trigger circuit being coupled to said split level or-circuit and supplying to the latter a signal indicative of the indicated state and of a magnitude which is less than said predetermined magnitude, said or-circuit being further coupled to said input circuit in feedback relation and responding to the signal of greatest magnitude which it receives by generating a signal which is fed to said input circuit, said or-circuit generating the latter said signal at a level which is less than said determinable level, said input circuit responding to the signal of highest level which it receives by generating output signals for transmission to said trigger circuit for selecting the stable state to be indicated by the latter, and reset means coupled to said trigger circuit and adapted for dominating the same and causing the latter to exhibit one of said stable states.

13. A transistor circuit adapted to respond to a source of input pulses of determinable level and comprising a first transistor circuit section coupled to said source for receiving said pulses, a second transistor circuit section coupled to and selectively receiving signals of predetermined magnitude from said first transistor circuit section, and a third transistor circuit section coupled to and receiving signals from said first transistor circuit section and responding to the latter said signals by indicating one of two stable states, said third transistor circuit section being coupled to said second transistor circuit section and supplying to the latter a signal indicative of the indicated state and of a magnitude which is less than said predetermined magnitude, said second transistor circuit section being further coupled to said first transistor circuit section in feedback relation and responding to the signal of greatest magnitude which it receives by generating a signal which is fed to said first transistor circuit section, said second transistor circuit section generating the latter said signal at a level which is less than said determinable level, said first transistor circuit section responding to the signal of highest level which it receives by generating output signals for transmission to said third transistor circuit section for selecting the stable state to be indicated by the latter.

References Cited in the file of this patent

UNITED STATES PATENTS

| | | |
|---|---|---|
| 2,892,099 | Gray | June 23, 1959 |
| 2,909,675 | Edson | Oct. 20, 1959 |
| 2,953,694 | Wilson | Sept. 20, 1960 |